Dec. 10, 1935.　　　　H. A. OTIS　　　　2,023,971
TRANSPORTATION MEANS
Filed June 10, 1931　　　3 Sheets-Sheet 2
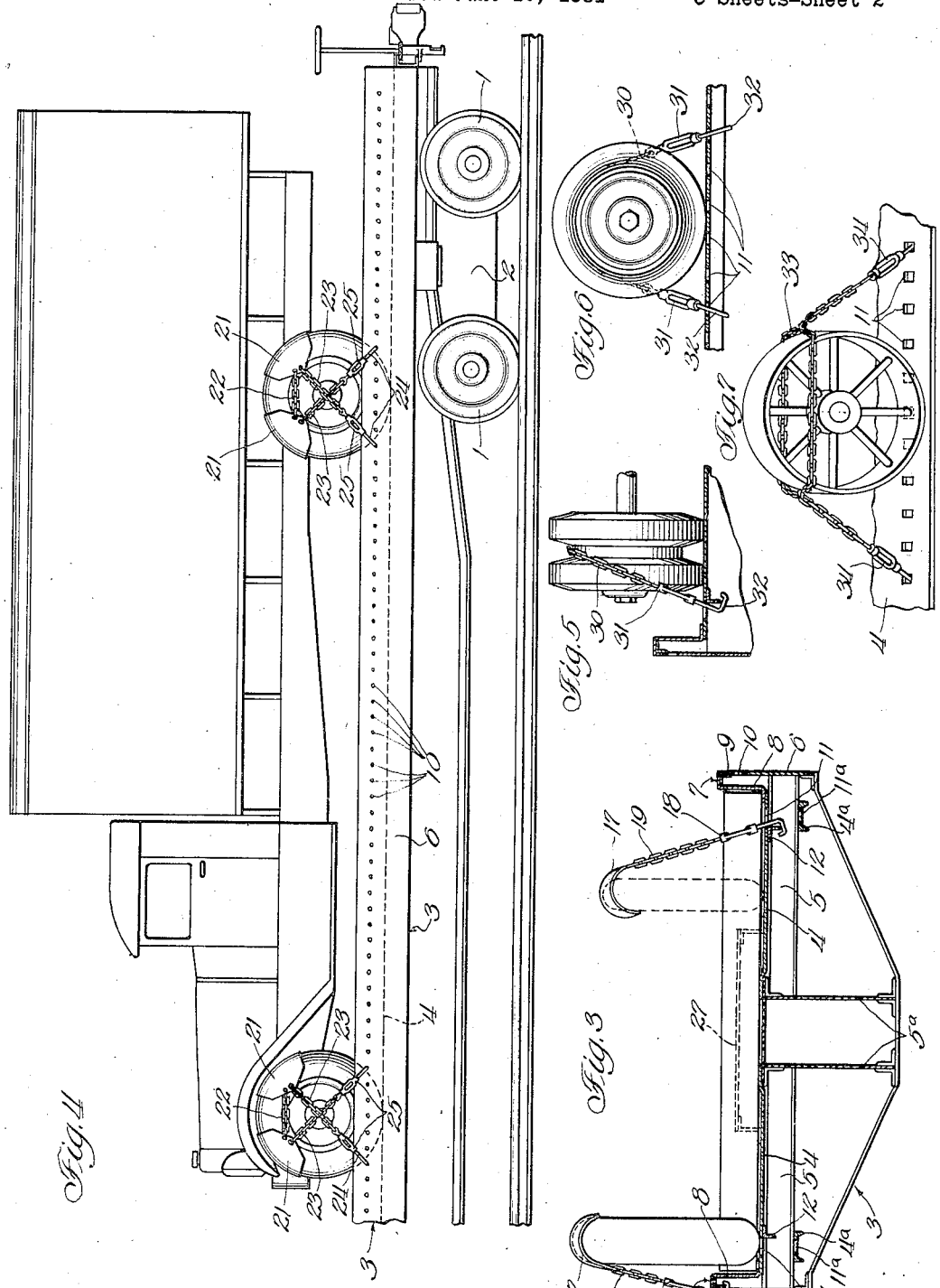

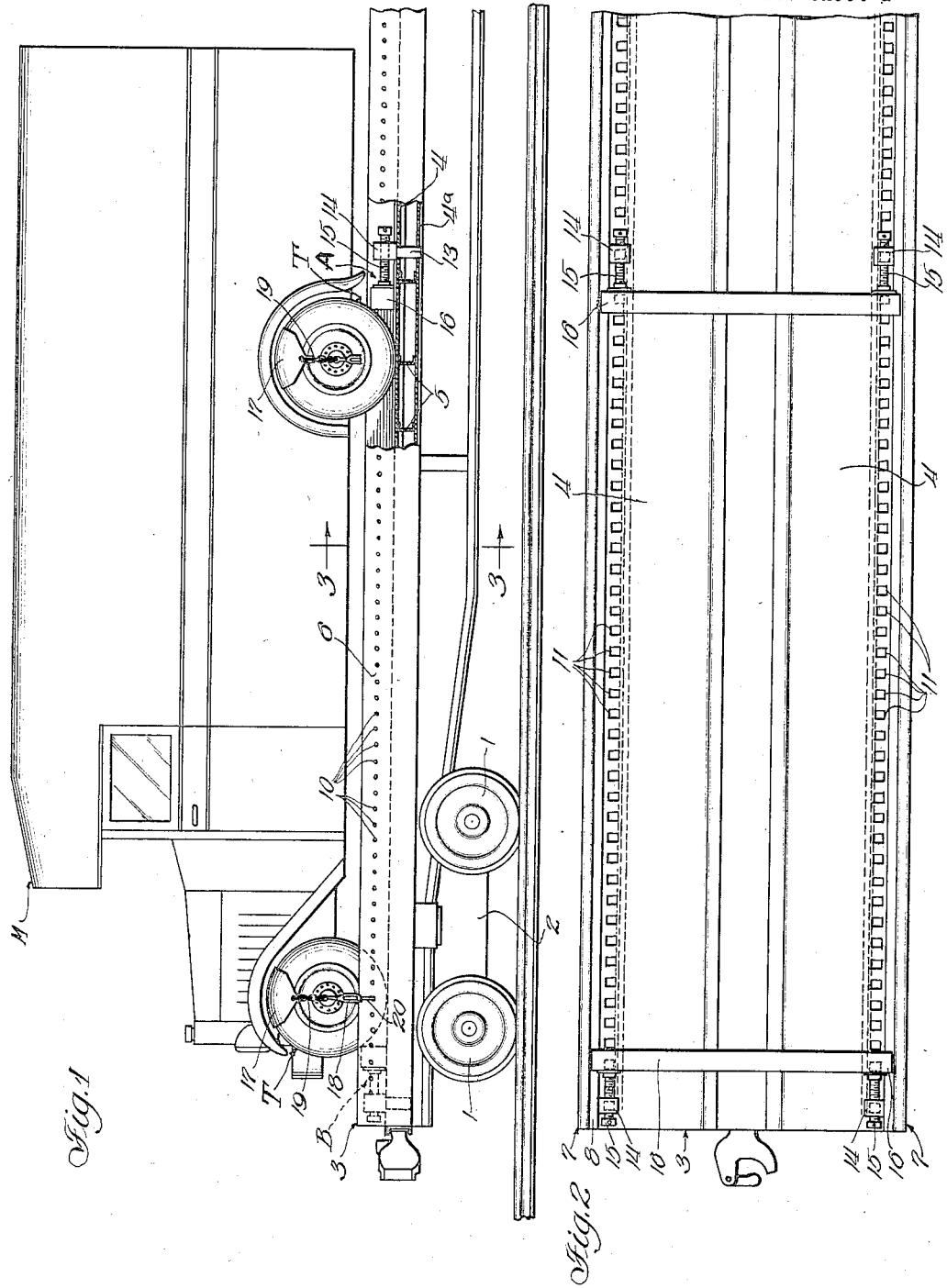

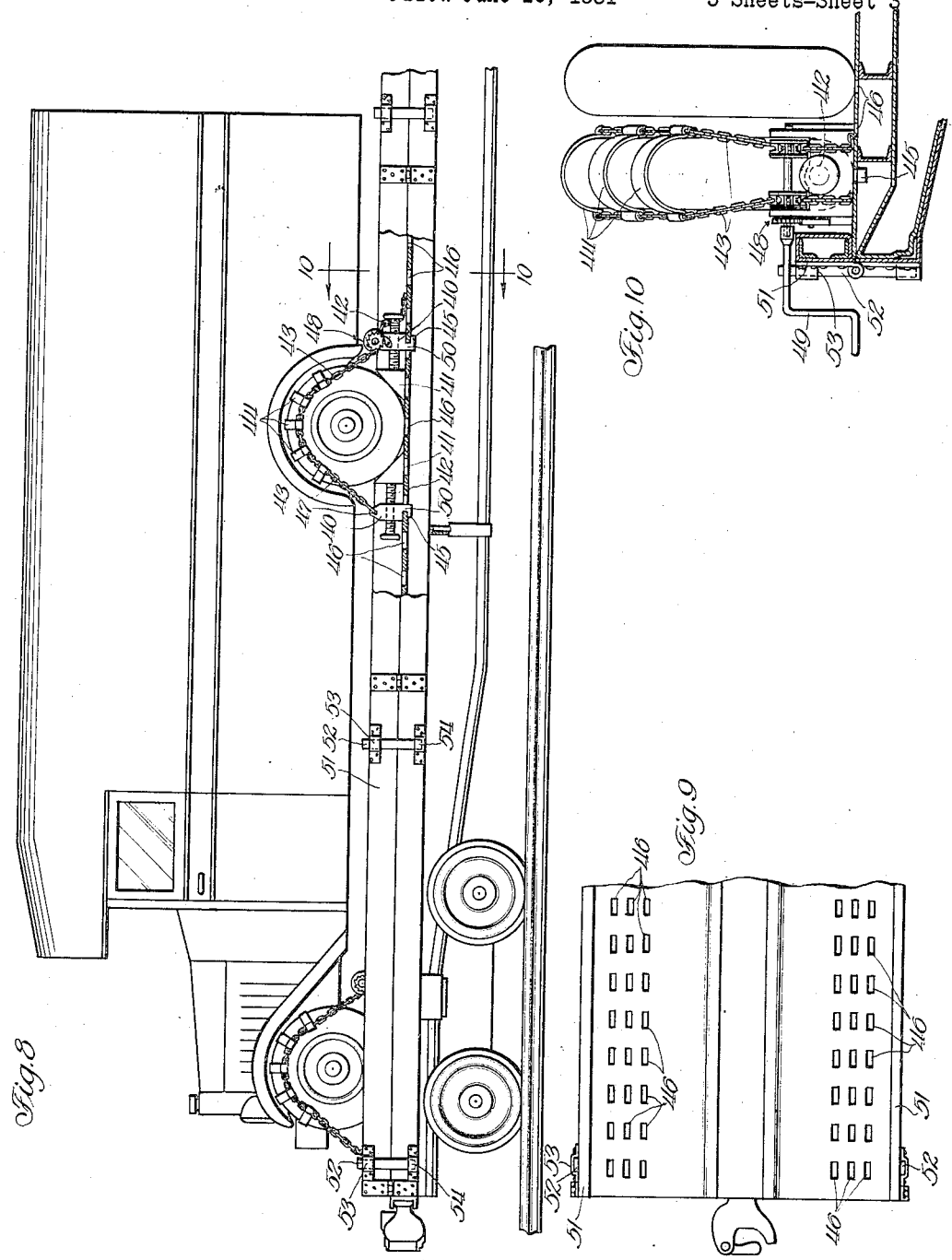

Patented Dec. 10, 1935

2,023,971

UNITED STATES PATENT OFFICE 2,023,971

TRANSPORTATION MEANS

Harold A. Otis, Glen Ellyn, Ill., assignor to Chicago, North Shore & Milwaukee Railroad Company, Chicago, Ill., a corporation of Illinois Application June 10, 1931, Serial No. 543,258

5 Claims. (Cl. 105—159)

My invention relates to transport means and is more particularly concerned with a track vehicle and fastening means associated therewith for anchoring a road vehicle into place upon said track vehicle for shipment thereon.

It is recognized that railroads are efficient and economical in transporting heavy loads at high speeds and at a high degree of safety and certainty in comparison with other means of transportation. On the other hand, road vehicles are advantageous because they may travel almost anywhere and, therefore, are not restricted to follow definite or fixed lines of travel, as are railroads. Needless to say, road vehicles are also advantageous in cities or towns to make deliveries to one or more destinations, as desirable, such vehicles being particularly adapted for that purpose. Moreover, it is known that in combining the above two forms of transportation, certain disadvantages of one form are counterbalanced by the advantages of the other form and vice versa. However, to my knowledge, no railroad car has been devised having suitably adaptable means for conveniently and expeditiously anchoring any type of road vehicle thereon with complete safety.

Fundamentally, the main problem involved is to devise a track vehicle which is particularly adapted for conveying road vehicles and which is provided with economical means for anchoring the road vehicle in fixed position relative to the track vehicle within a short space of time. Initially, a track vehicle of this type should be able to accommodate all kinds of road vehicles so as to have unlimited utility. Furthermore, it should not be required or necessary that the road vehicles be made to carry added equipment or to be specially designed in any way for the purpose of transportation on the track vehicle, it being obvious that if either of the foregoing were true, the economy and feasibility of the present invention would be somewhat defeated. Briefly, then, the problem is to suit the track vehicle to the road vehicles without regard as to what type or size the latter may happen to be, and inherently to devise a track vehicle which is capable of having the road vehicles quickly secured thereon and quickly releasable therefrom through adaptable fastening means, whereby loading and unloading of the road vehicles is expeditiously accomplished.

Accordingly, the main object of my invention is to provide a track vehicle, preferably in the form of a flat car, for suitably receiving one or more road vehicles thereon, and which is equipped with suitable means for firmly securing the road vehicles to the bed thereof, the road vehicles being transported with their own wheels resting upon said bed.

The provision of a means for securing the road vehicles into transportable position in relation to the track vehicle or flat car presented numerous difficulties. For example, the larger road vehicles such as moving vans or the like have exceedingly low beds, making it difficult for a man to crawl thereunder for attaching a fastening means to the axles or frames thereof. Then again, somewhat smaller vehicles may have sufficient room for a man to crawl thereunder to attach suitable fastening means to the frame or axles thereof, but it is apparent that the same means could not be utilized for the larger vehicles for the reasons above noted. Furthermore, the scheme of securing a road vehicle to the bed of a car by providing suitable fastening means for attachment to the frame or axles of the road vehicle is further objectionable for three reasons. First, too much time is required in the process of fastening and unfastening the vehicles to the car bed. Second, the fastening means should not only comprise a mechanism for holding the wheels of a road vehicle against the bed of a car and to prevent fore and aft movement relative thereto, but should also have the capacity to laterally brace the road vehicle to prevent lateral movement thereof on the car bed. Third, any fastening means that may be permanently located on the bed of the flat car is apt to interfere with the loading and unloading of the road vehicles onto and off of the flat car, and is also likely to interfere with road vehicles having considerably underslung bodies when the latter are to be transported. The means which I have devised to overcome the above related difficulties is universally adapted to anchor any type of road vehicle to the car bed, regardless of the wheel base or tread thereof, and regardless of the type of wheels or tires or of the respective dimensions of the same. The particular means of my construction extends between the wheels of the road vehicle and the bed of the flat car substantially externally of the sides of the vehicle, and functions to hold the road wheels of the vehicle firmly against the bed of the car, to prevent fore and aft movement of the road vehicle, and to brace the same laterally to prevent lateral slippage of the vehicle relative to the car bed, said means being completely adjustable for accommodating all types of road vehicles as will hereinafter appear from the detailed description thereof.

Now, in order to acquaint those skilled in the art with the manner of constructing and operating a device of my invention, I shall describe in connection with the accompanying drawings a specific embodiment of the invention.

In the drawings:

Figure 1 is a fragmentary side elevational view of a loaded railroad car embodying my invention;

Figure 2 is a plan view of the railroad car with the road vehicle removed therefrom;

Figure 3 is a vertical cross-sectional view through the bed of the railroad car, taken substantially on the plane of line 3—3 of Figure 1;

Figure 4 is a side elevational view of the continuation of the railroad car of Figure 1, but illustrating another method of fastening a road vehicle to said car;

Figure 5 is a fragmentary transverse sectional view through the railroad car to illustrate a third method of fastening a road vehicle to the bed of the car, this method being particularly applicable to vehicles provided with solid rubber tires;

Figure 6 is a side elevational view of the structure illustrated in Figure 5;

Figure 7 is another method of fastening a road vehicle to the bed of the railroad car which may be used with any type of wheel;

Figure 8 is a fragmentary side elevational view of the railroad car illustrating still another method of anchoring a road vehicle onto the car;

Figure 9 is a plan view of a portion of the railroad car with the vehicle and the fastening means omitted therefrom; and Figure 10 is a vertical cross-sectional view through one edge of the car taken substantially along the plane of line 10—10 of Figure 8.

Referring to Figures 1 to 3, the car of my invention comprises track wheels 1 embodied in a suitable truck 2 which may be of standard or any preferred design, these wheels being adapted to run upon the rails of a railroad. The wheels, trucks and rails may be of standard design or standard gauge, or of any preferred construction and gauge. The main body 3 of the car is suitably mounted upon the truck through pivotal connections, such as are well understood by those skilled in the art and which form in themselves no novel feature of the present invention. The body 3 provides a bed or platform 4 as a runway for the road vehicles. The bed may be of any suitable construction but is preferably of steel boiler plate secured by welding, riveting or bolting to the transverse channels 5 of the body carried by the central girders 5a. A pair of longitudinally extending channel irons 4a are secured to the underside of the transverse channels 5 and are provided with suitable perforations 11a, the purpose of which will hereinafter appear.

A pair of vertical longitudinally disposed plates 6 are suitably secured to the sides of the body. These plates project considerably above the surface of the bed plate 4 and constitute a part of the longitudinally extending wheel guards 7 which function to prevent the road vehicles from accidentally rolling off of the car when loading and unloading the same therefrom. The balance of each guard structure is composed of a Z iron 8 which constitutes a reenforcing tie between the plates 4 and 6, and provides the inner wall of the guard 7. Angle irons 9 likewise extend longitudinally of the car and serve as joining elements between the Z irons 8 and the plates 6, and are also provided for another purpose to be hereinafter described. It is to be understood that all of the aforesaid elements may be securely fastened together in any desired manner, and although welding may be preferable, rivets or bolts will serve for the same purpose.

Referring now more particularly to Figures 1 and 3, it is to be noted that the side plates 6 are provided with a plurality of perforations 10 throughout their length, the perforations being so located therein as to just clear the bottom edges of the vertical legs of the angle irons 9, as best shown in Figure 3. Likewise, the bed of the car 10 is also provided with a plurality of perforations 11 disposed substantially along the longitudinal margins of the bed and also throughout the length of the car as best illustrated in Figure 2. The latter perforations may be of any suitable shape or size to comply with various conditions and uses, but are, in the present construction, of square outline and are so positioned as to be in vertical alinement with the perforations 11a of the channels 4a, the latter perforations being of similar square outline. The bed is further provided with angle irons 12 secured to the underside thereof, the angles extending longitudinally of the car and adjacent the perforations 11 in the manner shown in Figure 3.

All of the foregoing description relates directly to the construction of the railroad car per se, and the car portrayed thereby is, as it stands, capable of receiving and accommodating not only ordinary loads but also various types of cooperating fastening devices which cooperate with the car to secure the road vehicles to the bed thereof in transport position.

The preferred form of means cooperating with the flat car for preventing fore and aft movement of a road vehicle relative thereto comprises a plug or stop having a square shank 13 and an enlarged head 14 with a threaded opening therein, a jack screw 15 threaded into said opening, and a stop block or chock beam 16 having its one end secured to the jack screw. The other end of the block is secured to a similar structure to that above described, and when in use, the block is disposed transversely of the flat car. This entire stop means may be placed anywhere along the bed of the car and firmly maintained in that position by inserting the shanks 13 through any of the pairs of transversely and vertically aligned perforations 11 and 11a, respectively. Once the block is in place, adjustment thereof longitudinally of the bed may be had by turning the jack screws in either direction depending upon the desired direction in which it is to be moved. Ordinarily two stop means are employed, one to prevent movement of the road vehicle in one direction, and the other to prevent movement thereof in the opposite direction, and in Figure 1 I have denoted one in its entirety by the reference character A and the other by B.

In order to prevent tipping of the road vehicle and lateral slippage thereof, a fastening means cooperating with the stop means just described is provided which comprises a saddle 17 and a turnbuckle 18 having one of its threaded shanks connected by any suitable means, such as chain 19, to the saddle and having its other threaded shank connected with or formed into a hook as indicated at 20. The saddle is adapted to be slipped over the upper periphery of the tire on the road vehicle wheel, while the hook 20 of the turnbuckle is adapted to be inserted through one of the perforations 10 in the side plate 6. The hook is of such size that it will engage both the upper edge of a perforation and the lower edge of the angle 9, the angle thus acting as a reenforcing means to prevent tearing of the plate and to reduce the ordinary wear to which the plate might otherwise be subjected.

Furthermore, the saddle is so shaped as to accommodate a large range of tire sizes, practically all sizes which are in ordinary use. This eliminates the necessity of providing more than one fastening means which would otherwise be undesirable.

When a road vehicle such as a motor van M (Figure 1) is to be transported from one destination to another, it may be driven under its own power onto the flat car. For this purpose, any suitable runway, ramp or platform on an equal level with the car bed, may be employed. The usual procedure would be to approximately position stop means A, followed by backing the van onto the car and thereafter setting the second stop means B. In setting the latter, it must be observed that the block cannot be immediately placed into its final position due to the curvature of the wheels and tires T and for the reason that the shanks 13 must be substantially vertically inserted through openings 11. The final positioning of stop means A and B is obtained by turning the jack screws 15 to bring blocks 16 firmly against the tires. While I have shown the chock beams 16 as square in cross section, it is to be understood that they may be of any shape, and they may also be beveled at points where they contact with the road vehicle wheels.

When the blocks are in place, one of the fastening means is secured to each wheel or tire by merely slipping the saddle thereover so that it securely embraces the same, and extending the turnbuckle until the hook end thereof can be inserted through one of the perforations 10 in side plate 6. Thereafter the turnbuckle is tightened up until the required amount of tension is obtained.

In placing the saddle 17 upon the wheel, it is desirable to position the same so that the chain, etc., are in substantially vertical position so as to not create a force which would tend to turn the wheel. When the inherent tensional force of the chain and its associated parts is acting directly through the axle of the wheel, all lateral components of the force are nil and turning of the wheel is therefore eliminated. It is obvious, however, that should any lateral components arise for any reason they are effectively resisted by the blocks 16.

Another form of fastening means is illustrated in Figure 4, whereby the stop means comprising the blocks 16 and associated parts are eliminated. This fastening means comprises a pair of saddles 21 joined by means of a chain 22, each of said saddles being provided with a chain 23 and a hook 24 which are joined by a turnbuckle 25. In securing a road vehicle to the flat car by the aforesaid fastening means, the saddles 21 are placed upon the tire in spaced relation to each other as determined by chain 22 and chains 23 are crossed by inserting hooks 24 into certain of the perforations 10 substantially as illustrated in Figure 4. With this form of fastening it is also desirable to have the chains disposed in such positions as to pass through the axial center of the wheel to eliminate all forces which may tend to turn the wheel and which might act to dislodge the saddles 21 therefrom. This is readily accomplished by inserting the hooks 24 into certain selected perforations 10 which will so dispose the chains. This method of mounting the saddles is not absolutely essential, however, particularly where the pair of saddles are connected together by the chain 22.

The saddles 21 are identical for all practical purposes with the saddles 17 shown in Figure 1. It is evident that only a single saddle may be used for each wheel as the sole fastening means by placing the same either forwardly or rearwardly of the axial center of the wheel and by connecting the tensioning means of the saddle to the car either rearwardly or forwardly of the axial center line of the wheel, respectively.

Both of the foregoing forms of fastening means are shown as connected with the side plates 6 of the flat car. This is essential when the road vehicles are of the larger tread sizes. However, when transporting road vehicles of smaller tread sizes, the hook members of the fastening means can be readily inserted through perforations 11 in the bed of the flat car and into engagement with the edges of the longitudinally extending angle irons 12 in the manner best illustrated to the right in Figure 3.

Although not necessary, the flat car may be provided with a raised center or mound as indicated at 27 to furnish a guide for vehicles of smaller tread sizes. Such a mound acts to aid in centering the road vehicles upon the car. The centering of the vehicles will also allow the respective fastening means to be disposed symmetrically, whereby all of the respective means will be subjected to substantially the same stresses during transportation.

Another form of fastening means is exemplified in Figures 5 and 6, this form being particularly applicable to vehicle wheels of the tandem solid tire construction. Here, a single chain 30 is utilized which is preferably provided with two turnbuckles 31 having hooks 32 of the class hereinbefore described. With this construction the chain 30 is looped over the wheel in the longitudinal direction of the flat car. It is obvious that this form of fastening means may also be used with other types of tandem tired wheels, such as dual pneumatics and the like. It is also apparent that the saddle forms of fastening means are likewise applicable to wheels such as shown in Figure 5, in which case the saddles can be provided somewhat flatter in cross-section as to substantially conform with the sectional contour of the hard rubber tires.

Figure 7 illustrates a fastening means which can be universally used in connection with any type of vehicle wheel, and comprises a chain loop 33 for straddling or embracing the wheel substantially horizontally and having turnbuckle tensioned attachment means 34 secured to the ends thereof, the latter being constructed like the turnbuckle means of the preferred form.

In Figures 8, 9 and 10 I have illustrated a form of fastening means which combines the chocks and saddle means whereby the positioning of the chocks along the car bed also positions the saddle means for engagement with the wheels, and which means further includes another type of tensioning device. Each of the fastening means comprises a pair of anchors or stops 40 having beveled chocks 41 adjustably connected therewith by means of jack screws 42, and chains 43 connecting suitably spaced saddles 44 with the anchors. The anchors are provided with tongues 45 which are adapted to be inserted through suitable apertures 46 located in the car bed, the tongues engaging the underside of the bed when in position in the manner best shown in Figure 8. In order to be able to accommodate road vehicles of various tread sizes the apertures 46 are spaced laterally of the car as well as longitudinally. The chains 43 are secured to one of the anchors as at 47, and the loose ends of the chains are received by a ratchet controlled windlass mechanism 48 which is mounted on the other anchor. A removable crank 49 is utilized for turning the windlass mechanism to draw up the chains to any desired tension for tightly seating the saddles upon the vehicle wheel, and the ratchet means functions to maintain the chains under tension until released.

It is to be noted that the chocks 41 are only of such length as to firmly block one wheel against fore and aft movement and do not extend across the full width of the car bed as in the preferred form of construction. By making the tongue stems 50 of the anchors rectangular or square in cross-section and by forming the apertures 46 in the car bed of similar shapes it is possible to prevent turning movement of the anchors thereby maintaining the chocks at all times in perfect transversely disposed blocking position.

When utilizing this form of fastening means it may be inconvenient at times to set certain of the chocks in their proper positions when anchoring road vehicles substantially of car width and with low bodies, because of the upwardly projecting car sides which form the wheel guards. To overcome this possibility, each car side is provided with a hinged wheel guard such as 51 which may normally be maintained in vertical position by any desirable means such as stakes 52 inserted into straps 53 and 54, the former being carried by the wheel guard and the latter by the fixed car side respectively. Although the wheel guard is preferably shown as one continuous piece, it may also be divided into a plurality of hinged sections if need be. With this construction, the road vehicles may be readily driven onto the car and thereafter the stakes may be removed to allow the guards 51 to be swung outwardly to provide ample room for setting the chocks. After the chocks are in place the guards are again returned to vertical position and the stakes inserted into the straps.

It is apparent that changes may be made in the specific structural elements and in the particular combinations shown which will not depart from the scope of the present invention. Therefore, I do not intend to be strictly limited to the specific description and illustrations of the device, but only in so far as the appended claims are so limited.

What I claim is:

1. A railroad car comprising a bed plate having perforations therein, perforated side plates projecting above the surface of the bed plate and extending longitudinally thereof, and Z-irons connected between the projecting edges of said plates and the bed plate for bracing the aforesaid plates, said Z-irons constituting guards.

2. A railroad car for receiving attachment means to anchor a road vehicle thereon, comprising a bed plate having perforations therein disposed substantially along the longitudinal marginal edges thereof, perforated side plates projecting above the surface of the bed plate and extending longitudinally therealong in spaced relation to the marginal perforations of the latter, said bed perforations being adapted for receiving attachment means when transporting road vehicles of narrow tread sizes, and said perforations of said side plates being adapted for receiving attachment means when transporting road vehicles of larger tread sizes.

3. In combination, a track vehicle having a perforated bed, a second vehicle having its wheels supported on said bed, means for blocking said second vehicle against movement in one longitudinal direction upon said bed, means for blocking said second vehicle against movement in the opposite direction upon said bed comprising transversely spaced members positioned within certain of said bed perforations and held against movement relative to said bed, a transversely disposed member connected with both of said transversely spaced members and adjustable relative thereto and having cooperative engagement between one pair of wheels of said second vehicle and said bed to prevent relative movement between said vehicles, and means connected directly between said vehicles independently of said blocking means to prevent lateral tilting and shifting of said second vehicle relative to said bed.

4. In combination, a track vehicle comprising a platform car provided with track wheels and having at the outer edge of each side a guard member projecting upward above the platform thereof, said guard members each having therein a series of perforations extending lengthwise thereof, a wheeled road vehicle having its wheels resting upon said platform, and adjustable holding means engaging over the upper portions of the wheels of said vehicle and engaging into selected perforations of said guard members, said holding means extending downward and outward from the respective wheels and acting by tension to hold said wheels against upward and inward movements relative to said platform.

5. In combination, a track vehicle comprising a platform car provided with track wheels and having at the outer edge of each side a guard member projecting upward above the platform thereof, said guard members each having therein a series of perforations extending lengthwise thereof, a wheeled road vehicle having its wheels resting upon said platform, and adjustable holding means engaging over the upper portions of the wheels of said vehicle and engaging into selected perforations of said guard members, said holding means extending downward and outward from the respective wheels and intersecting the axes thereof.

HAROLD A. OTIS.